United States Patent
Akamatsu

[15] 3,683,267
[45] Aug. 8, 1972

[54] POWER CONTROL SYSTEM

[72] Inventor: Masahiko Akamatsu, Amagasaki, Japan

[73] Assignee: Mitsubishi Denki Kabushiki Kaisha, Tokyo, Japan

[22] Filed: Dec. 1, 1969

[21] Appl. No.: 881,225

[30] Foreign Application Priority Data

| Dec. 14, 1968 | Japan | 43/91814 |
| Dec. 26, 1968 | Japan | 43/95751 |
| Feb. 3, 1969 | Japan | 44/8033 |
| Dec. 2, 1968 | Japan | 43/88144 |
| Feb. 3, 1969 | Japan | 44/8034 |
| Feb. 19, 1969 | Japan | 44/12394 |
| July 2, 1969 | Japan | 44/57571 |

[52] U.S. Cl. ............................321/45 R, 321/45 C
[51] Int. Cl. .......................................H02m 7/48
[58] Field of Search ...............321/43–45, 45 C

[56] References Cited

UNITED STATES PATENTS

| 3,340,457 | 9/1967 | Schmitz | 321/45 |
| 3,349,315 | 10/1967 | Studtmann | 321/45 |
| 3,364,408 | 1/1968 | Katz et al. | 321/45 |
| 3,405,346 | 10/1968 | Krauthamer | 321/45 |
| 3,417,315 | 12/1968 | Corey | 321/45 |
| 3,422,342 | 1/1969 | Jackson | 321/45 |
| 3,423,665 | 1/1969 | Greenberg et al. | 321/45 X |
| 3,465,233 | 9/1969 | Johnston et al. | 321/45 |

*Primary Examiner*—William M. Shoop, Jr.
*Attorney*—Robert E. Burns and Emmanuel J. Lobato

[57] ABSTRACT

In power control including at least two thyristors disposed between a dc input and an ac output and at least one capacitor interconnecting the thyristors in pair, a nonlinear reactor is serially connected to each thyristor and one of the thyristors is fired to apply a voltage accumulated on the capacitor, to the other thyristor, as a reverse bias, to effect commutation. A diode can be connected to reverse parallel to each thyristor. Also a commutation transformer can be disposed in a path along which the voltage across the capacitor is applied to either of the thyristors.

13 Claims, 30 Drawing Figures

POWER CONTROL SYSTEM

BACKGROUND OF THE INVENTION

This invention relates to a power control system having a direct current power applied to the input thereof and including thyristors for controlling an alternating current output therefrom or converting the direct current power to an alternating current power.

As power control systems of the type referred to there have been previously widely imployed McMurrey and Bed-Ford type inverters. That type of inverters has been operated to have a period of time for which an energy accumulated on a commutation reactor involved is released and which could amount to about 20 to 50 times an interval of time for which the associated thyristor is reversely biassed. Within the release period of time a current flowing through the thyristor gradually decreases from about two time a peak magnitude of maximum output current in approximately rectilinear or exponential manner.

What particularly comes into question is a long transient commutation time within which a ratio of a commutation current to a load current is high and particularly when the operating frequency is high. Therefore the thyristors have decreased in current utilization and the actually operating frequency is restricted in upper limit. Further the release of the energy accumulated on the commutation reactor as above described has lead to a loss of energy because such energy is delivered to either the source of electric power through a transformer or to the associated resistor. In addition, the commutation reactor has included a magnet core having an air gap leading to the generation of the noise.

SUMMARY OF THE INVENTION

Accordingly it is an object of the invention to provide a new and improved power control system low in commutation current, short in transient commutation time, and decreased in magnitude of a current required for each of thyristors involved as well as increasing the upper limit of the practically operating frequency.

It is another object of the invention to provide a new and improved power control system decreased in loss of commutation thereby to increase the system efficiency.

It is still another object of the invention to provide a new and improved power control system minimized in noise level.

It is a further object of the invention to provide a new and improved power control system small-xized and inexpensive to be manufactured.

It is an additional object of the invention to provide a power control system including an improved commutation reactor capable of easily resetting a magnetic flux therein to its unsaturated region.

It is still another object of the invention to provide a new and improved power control system in which a voltage applied across a thyristor involved is suppressed from increasing and a magnetic flux in commutation reactor is rapidly reset to its unsaturated region.

The invention accomplishes the above cited objects by the provision of a power control system comprising a pair of terminals for a source of direct current, a pair of alternating current output terminals, at least two semiconductor controlled rectifiers each connected one of the direct current terminal and one of the alternating current output terminals, a commutation circuit including the semiconductor controlled rectifiers to alternately switch the latter in a predetermined order, at least a commutation capacitor connected in the commutation circuit and a current path for supplying a load current through the semiconductor controlled rectifiers, characterized in that one reactor is connected in series circuit relationship to each of the controlled rectifiers in the current path.

The reactor may be preferably a nonlinear reactor.

Advantageously, the commutation circuit may include, in addition to the capacitor, at least a reactor element and one semiconductor diode may be connected in reverse parallel circuit relationship to each of the semiconductor controlled rectifiers. Alternatively the commutation circuit may be formed of at least the commutation capacitor and a commutation transformer.

In order to prevent a voltage applied across each of the semiconductor controlled rectifiers from increasing above a voltage across the direct current terminals, one clamping semiconductor diode may be connected between the junction of the first-mentioned reactor and the associated semiconductor controlled rectifier and one of the direct current terminals.

BRIEF DESCRIPTION OF THE DRAWINGS

The invention will become more readily apparent from the following detailed description taken in conjunction with the accompanying drawings in which:

FIG. 4b is a graphic representation of commutation waveforms developed in the system illustrated in FIG. 4a;

FIG. 7 is a schematic circuit diagram of another modification of the system illustrated in FIG. 4a;

DESCRIPTION OF THE PREFERRED EMBODIMENTS

Figure 1:
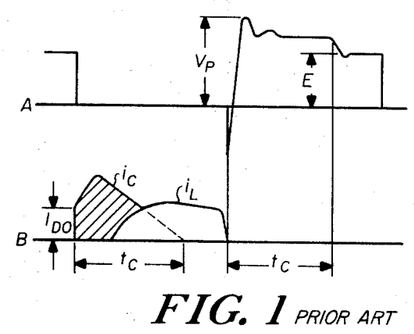
FIG. 1 is a graphic representation of commutation waveforms developed in the well known McMurrey and Bed-Ford type of inverters.

Referring now to the drawings and FIG. 1 in particular there is illustrated commutation waveforms developed on the McMurrey and Bed-Ford type of inverters as previously outlined. In FIG. 1 waveforms A and B represents a voltage applied across and a current flowing through thyristors involved respectively, at the beginning of a transient commutation time $t_c$ a thyristor is fired to be transiently applied with a high voltage $V_p$ as shown in FIG. 1A. During the commutation time a voltage less than the voltage $V_p$ but still higher than a voltage across the associated source of direct current (not shown) continues to be applied across the thyristor and after the commutation time the thyristor has applied thereacross the voltage across the source. It is noted that the commutation time $t_c$ is long as shown in FIG. 1.

Also FIG. 1 shows at current waveform B that, upon turning on the thyristor, a commutation current flowing therethrough abruptly increases to that magnitude $I_{oo}$ of a load current flowing therethrough just before the particular commutation has been effected leading to a great increase in time differential coefficient of the current or $di/dt$. This resulted in critical conditions for operating the system and the higher the current and voltage for or the capability of the system that $di/dt$ would come into question.

Also due to the long commutation time $t_c$ a ratio of an integrated commutation current $i_c$ (which is shown by a hatched portion) to an integrated load current $i_L$ has increased and particularly when the operating frequency is high. For example, with an inverter formed of thyristors having a turn-off time of 30 microsecond to be operated at a frequency in the order of 100 Hz the proportion of the commutation current contributing to an increase in temperature of the thyristor has amounted to about 30 percent and it has often exceeded 50 percent.

Thus the thyristors have decreased in current utilization leading to a decrease in output available with the same thyristor or to an increase in current capacity required for thyristors used. This resulted in the restriction of the upper limit of the practically operating frequency as previously described.

As previously described, an energy accumulated on the commutation reactor has been at least partly lost. If the energy has been fed back to the associated source through a transformer, the feedback efficiency has been very low due to the leakage inductance and resistance of the transformer and most of the energy has been lost. Alternatively, if the energy is delivered to the associated resistor, all the energy has been not only lost but also a loss due to that portion of the load current flowing through the resistor has been added to the former loss, resulting in a great loss of commutation and therefore in a decrease in efficiency. Thus an increase in current required for the thyristor and a decrease in efficiency has particularly come into question for high capability and relatively high frequency apparatus.

In addition, the use of a magnetic core of a commutation reactor having an air gap has caused the noise as previously described.

Figure 2:
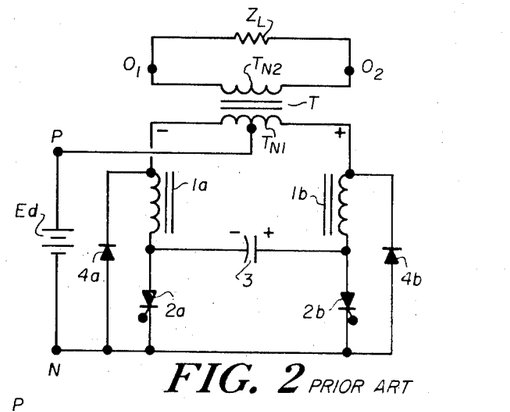
FIG. 2 is a schematic circuit diagram of a power control system constructed to provide an improvement over systems such as described with respect to FIG. 1.

In order to eliminate the above-mentioned disadvantages, the circuitry as shown in FIG. 2 has been proposed. The arrangement illustrated in FIG. 2 comprises a source of direct current $E_d$ having a pair of direct current (dc) terminals. One of the terminals, in this example the positive terminal P is connected to a center tap on a primary winding $T_{N1}$ of an output transformer T and the other or negative terminal N is connected to either end of the primary winding $T_{N1}$ through a series combination of nonlinear reactor and thyristor $1a$ and $2a$ or $1b$ and $2b$. The junction of the nonlinear reactor $1a$ and the thyristor $2a$ is connected to the junction of the reactor $1b$ and the thyristor $2b$ through a commutation capacitor 3 for serving to effect commutation between the thyristors $2a$ and $b$, a main semiconductor diode $4a$ or $b$ is connected across the associated series combination $1a$–$2a$ or $1b$–$2b$ and poled oppositely to the thyristor $2a$ or $2b$ respectively. The output transformer T includes a secondary winding $T_{N2}$ having a pair of output terminals $O_1$ and $O_2$ across which is connected a load $Z_L$.

The nonlinear reactor $1a$, thyristor $2a$ and diode $4a$ are substantially identical in construction and operation to the corresponding components $1b$, $2b$ and $4b$ respectively.

The operation of the arrangement as above described will now be described. Assuming that one of the thyristors, for example the thyristor $2a$ is in its conducting state by applying to its gate electrode a gating voltage from any suitable source of voltage (not shown). The output transformer T have developed across the primary winding $T_{N1}$ a voltage having a polarity illustrated beside the winding and the capacitor 3 has been charged with voltage substantially equal to the voltage across the terminals P and N and having a polarity illustrated beside the same while the nonlinear reactor $2a$ is maintained saturated.

The succeeding firing of the other thyristor 2b permits the voltage across the capacitor 3 to reversely a bias the conducting thyristor 2a to render it nonconductive. Within the nonconducting period of time for the thyristor 2a, a current flows from the end labelled the symbol of the primary transformer winding $T_{N1}$ through the nonlinear reactor 1b and the now conducting thyristor 2b but it is suppressed by an unsaturated impedance presented by the nonlinear reactor 1b.

On the other hand, the nonlinear reactor 1a has supplied thereto a voltage equal to the reverse voltage applied across the thyristor 2a through the diode 4a. Thus an oscillation current flows through a closed loop including the thyristor 2b, the diode 4a, the reactor 1b and the capacitor 3 whose frequency is determined by the saturated residual inductance of the reactor 1a and the capacitance of the capacitor 3 with the result that the nonlinear reactor 1a is reset to its unsaturated flux region. This causes the capacitor 3 to charge with the sum of a load current having flowed through the thyristor 2a just before the latter became nonconducting and the said oscillation current progressively increased in amplitude due to the saturated inductance of the reactor 1a but with the polarity reverse from that during the conduction of the thyristor 2a.

In other words, if the system is unloaded at that time then the capacitor 3 is rapidly charged with the oscillation current alone. Alternatively if the system is loaded then the capacitor is more rapidly charged with the resultant magnitude of the particular load current and the oscillation current. The more the loading on the system the higher the charging rate of the capacitor will be.

On the other hand, the now conducting thyristor 2b has flowing therethrough a current reversely charging the capacitor 3 while a current from the reactor 1b is of a minimum magnitude due to the unsaturated inductance of the reactor.

After the completion of the particular commutation, a returning current from the load $Z_L$ flows through the diode 4b while what flows through the thyristor 2b is formed of an exciting current for the nonlinear reactor 2b very low in magnitude and decayed.

After the completion of the particular commutation the load current is reversed in polarity whereupon the nonlinear reactor 1b is saturated to cause the load current to flow through the conducting thyristor 2b. Then the conducting thyristor 1a changes from the thyristor 2b to the thyristor 2a to repeat the process as above described.

Thus it will be appreciated that by using the nonlinear reactors, an energy previously accumulated on one of the nonlinear reactors is rapidly transferred to the capacitor, during the commutation time period while an energy accumulated in the other reactor is very low whereby the communication current is allowd to flow through the particular thyristor only for a short time resulting in the communication current averaging a very small magnitude.

Figure 3:
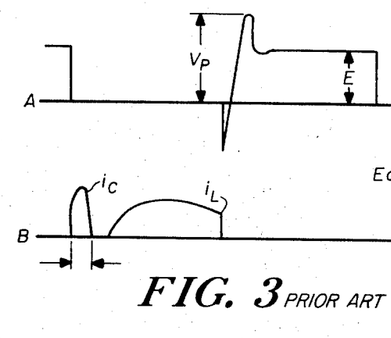
FIG. 3 is a graphic representation of commutation waveforms developed on the system illustrated in FIG. 2.

FIG. 3 wherein like reference characters have the same meaning as in FIG. 1 illustrate waveforms of voltage and current developed in the system of FIG. 2. By comparing FIG. 1 with FIG. 3 it will be seen that in the arrangement of FIG. 2 the commutation time $t_c$ becomes equal to from three to six times a time for which either of the thyristor is reversely biased. That is, as compared with the systems described in conjunction with FIG. 1 the commutation time of the circuitry of FIG. 2 reduces by a factor of about seven and the mean commutation current reduces by a factor of from about 5 to 10.

In the arrangement of FIG. 2 the re-charge rate for the commutation capacitor 3 greatly depends upon the magnitude of the load current. This leads to a long commutation time $tc$ under light loading. Therefore, a drecrease in commutation time has been required to decrease the inductances of the reactors 1a and b. Alternately, it has been necessary to rapidly saturate the reactors.

However, a decrease in inductance of each reactor 1a or b has caused an increase in current flowing through the capacitor 3, the thyristor 2b, the diode 4a and the reactor 1a during the commutation, thus leading to the necessity of using a large commutation capacitor. Simultaneously, the reactor 1b has drawn a higher current from the source of direct current $Ed$ resulting in a further increase in capacitance of the commutation capacitor.

In addition, the energy accumulated in the reactor 1b during the commutation time increases and causes a corresponding increase in energy accumulated in the commutation capacitor. Thus, the commutation loss is increased. The increase in energy accumulated by the reactor 1b is accompanied by an overshoot voltage or an oscillating voltage component across the thyristor as shown at $V_p$ in FIG. 3.

The invention contemplates the elimination of the disadvantages just described and provides a power control system of shortened commutation time, low in overshoot voltage or peak voltage across the thyristor connected in the system, and low in commutation loss.

Figure 4A:
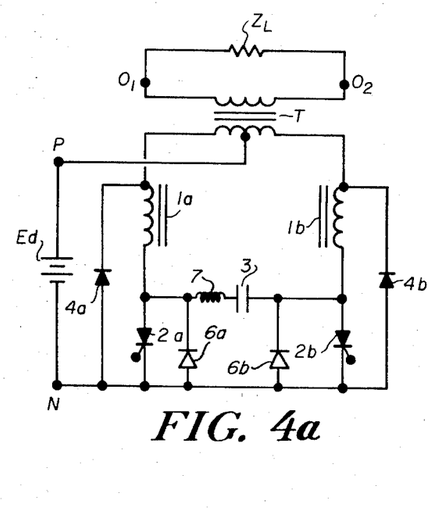
FIG. 4a is a schematic circuit diagram of a power control system constructed in accordance with the principles of the invention.

Referring now to FIG. 4a there is illustrated a power control system constructed in accordance with the principles of the invention. The arrangement illustrated is similar to that shown in FIG. 2 but also includes semiconductor diodes 6a and 6b connected respectively in reverse parallel circuit relationship across each of the thyristors 2a and b, as well as a commutation reactor 7 serially connected to the commutation capacitor 3. Therefore, like reference characters have been employed to identify the components identical to those shown in FIG. 2.

In operation the commutation reactor 7 cooperates with the commutation capacitor 3 to permit an oscillating pulse current to flow therethrough upon the commutation, whereby the commutation from one to the other of the thyristors is rapidly completed. For example, upon effecting the commutation from the thyristor 2a to the thyristor 2b, the conduction of the thyristor 2b causes the electric energy charged on the commutation capacitor 3 to oscillate in a closed loop traced from the commutation capacitor 3 through the thyristor 2b, the diode 6a and the commutation reactor 7, and thence to the capacitor 3. Therefore, the thyristor 2a is reversely biased only when the resulting oscillating pulse current is in excess of a current flowing through the nonlinear reactor 1a. Then, at a time point when the thyristor 2a is reversely biased through the above-described oscillation, that is to say, when the diode 6a is fully conducting, the capacitor 3 is already charged with the polarity reversed from that illustrated.

It has been found that the oscillation operation as above-described is required only to have its half period equal to about twice or three times the turn-off time of the thyristor 2a. Therefore, in the arrangement of FIG. 4a the time interval for which the commutation capacitor 3 is re-charged, or the commutation time tc, is extremely decreased to permit the high speed switching operation. In addition, the commutation time depends upon the period of natural oscillation determined by the commutation reactor and capacitors 7 and 3, respectively, and is scarcely affected by the magnitude of the load current.

Furthermore, the nonlinear reactors 1a and b are serially connected to the thyristors 2a and b, respectively, such that they are not operatively coupled to each other. That is, the reactors are operative independent of each other and are therefore able to be saturated by a flow of load current therethrough. In other words, the reactors 1a and b can be saturable reactors.

Figure 4B:
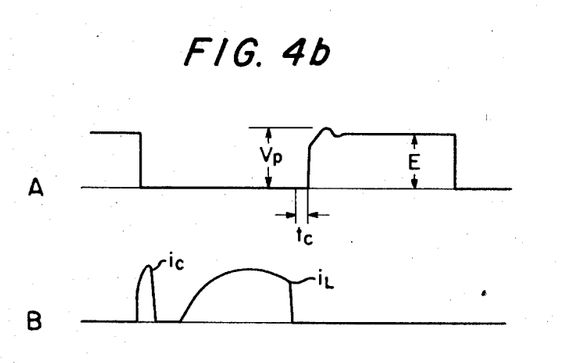

With saturable reactors used as the reactors 1a and b, it is possible to minimize the saturated inductance of the reactor 1a while rendering the unsaturated inductance to the reactor 1b as high as possible. This measure permits a decrease in the energy accumulated in each reactor 1a or b. As the overshoot voltage $V_p$ across the thyristor is affected by the energy accumulated in the associated reactor, the same can decrease as shown in FIG. 4b wherein like reference characters have the same meaning as those shown in FIG. 3. Accordingly, the commutation loss can be minimized.

Figure 5:
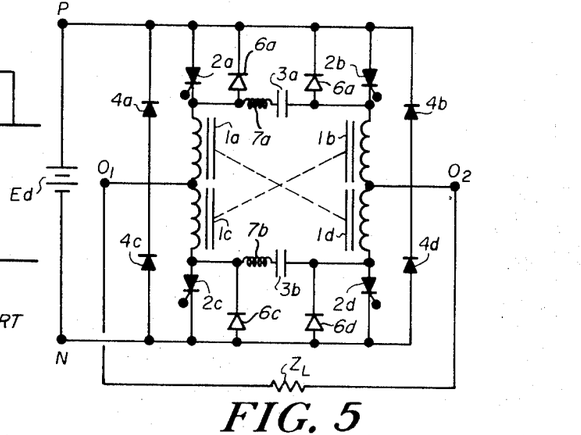
FIG. 5 is a schematic circuit diagram of a bridge type power control system constructed in accordance with the principles of the invention.

FIG. 5 shows a modification of the invention embodied into a bridge type circuit. In FIG. 5 and the succeeding Figures like reference characters designate the components similar or identical to those illustrated in FIGS. 2 and 4a. As shown, the bridge circuit has four arms each including a series combination of nonlinear reactor 1 and the commutation capacitor 3 connected across the respective main diode 4 with the thyristors similarly pole with respect to the source $E_d$. The junctions of the thyristors 2a, and b, c and d are connected to the source terminals P and N respectively and those of the nonlinear reactors 1a and c, b and d have the respective output terminals $O_1$ and $O_2$ across which is connected the load $Z_L$. The reactors 1a and d are shown as being magnetically coupled to the reactors 1a and b respectively. Further the junction of the reactor and thyristor 1a and 2a or 1c and 2c is connected to the junction of the reactor and thyristor 1b and 2b or 1d and 2d through the commutation capacitor 3a or b respectively.

The thyristors 2a and d are adapted to be simultaneously turned "ON" and "OFF" while the thyristors 2b and c are adapted to be simultaneously turned "ON" and "OFF" but alternately with respect to the thyristors 2a and d respectively. Therefore it will be appreciated that the system shown in FIG. 5 is identical in commutation mode of operation to the system of FIG. 4a.

Figure 6:
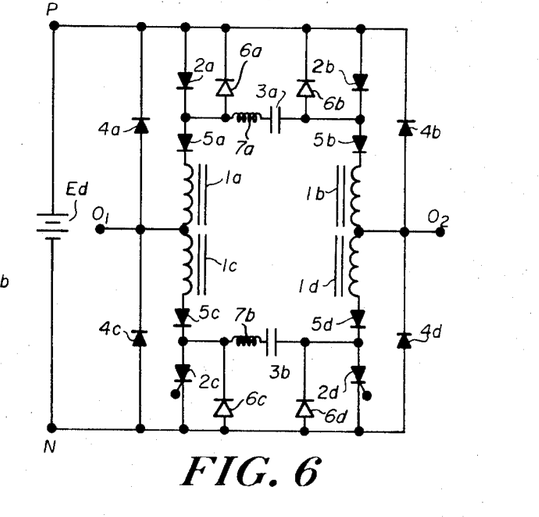
FIG. 6 is a schematic circuit diagram of a modification of the system illustrated in FIG. 5.

FIG. 6 shows an arrangement similar to FIG. 5 except for a serially semiconductor diode being connected between the associated nonlinear reactor and thyristor with the commutation capacitor connected between the junctions of the diodes and thyristors. For example, the diode 5a is connected between the nonlinear reactor 1a and the junction of the thyristor 2a and the capacitor 3 or 3a.

The diode 5 serves to prevent the associated capacitor charged to a voltage above the source voltage through the associated nonlinear reactor after the particular commutation from discharging in the direction opposite to the charging direction.

This measure ensures that a voltage charged on the capacitor is maintained high resulting in an increase in commutation performance and therefore is particularly effective for using with low voltage, high current apparatus.

Figure 7:
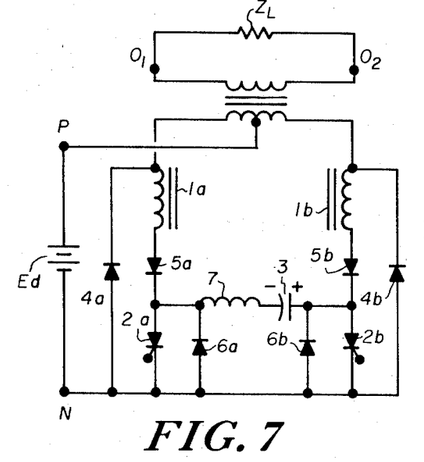

FIG. 7 shows a modification of the system as illustrated in FIG. 4a, and differs in the connection of a pair of semiconductor diodes 5a and b in series, respectively, with the reactors 1a and b and the thyristors 2a and b, with the same polarity as the latter. Therefore, the operation of the arrangement as shown in FIG. 7 will be readily understood from the description related to FIGS. 4a and 6.

The voltage across the capacitor 3 then increases with the polarity opposite to that illustrated to decrease the current flowing the capacitor until that current equals the load current. At that time the commutation diode 6a becomes nonconducting to permit a forward voltage to be applied across the thyristor 2a with the result that the capacitor 3 continues to be charged in oscillatory manner through the nonlinear and commutation reactors 1a and 7 respectively to compensate for a deficent amount of charge thereon.

When the capacitor 3 has reached a predetermined voltage approximately equal to twice the source voltage, the diode 4b is fired. At that time the nonlinear reactor 1b still remains unsaturated and the thyristor 2b has a very low exciting current flowing therethrough while decaying.

As in the previous examples the load current is reversed in polarity to saturate the nonlinear reactor 1b with the result that the load current with the reversed polarity is supplied to the load $Z_L$ through the thyristor 2b. Then the thyristor 2a is again fired to repeat the process as above described.

Figure 8:
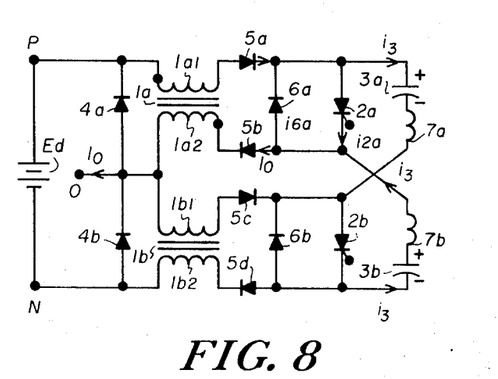
FIG. 8 is a schematic circuit diagram of a modification of the invention.

FIG. 8 illustrates another form of the invention corresponding to the system of FIG. 7 with the output transformer T omitted. The nonlinear reactors 1a and b each include a pair of windings 1a1 and 1a2 or 1b1 and 1b2 preferably inductively coupled to each other as shown in FIG. 8. The windings 1a2 and 1b1 are connected at one end together to the junction of the diodes 4a and b and to the output terminal O. The dot convention is used to identify the instantaneous polarity of the each winding. The winding 1a2 is serially connected to a cathode electrode of a semiconductor diode 5c having an anode electrode connected to the anode and cathode electrodes respectively of the commutation diode 6a and thyristor 2a. Similarly the winding 1b2 is connected to a semiconductor 5d and thence to the commutation diode 6b and the thyristor 2b.

The cathode electrodes of both the thyristors 2a and b are interconnected through a series combination of reactor 7b and capacitor 3b while the anode electrodes thereof are interconnected through a series combination of reactor 1a and capacitor 3a. In other respects the arrangement is substantially similar to that shown in FIG. 7.

The arrangement as above described is operated as follows: Assuming that the thyristor 2a is in its conducting state, a load current $i_L$ flows from the terminal P of the dc source $E_d$ through one winding $1a1$ of the nonlinear reactor $1a$, the series diode $5a$, the now conducting thyristor $2a$, the series diode $5c$, the other winding $1a2$ of the reactor $1a$, the output terminal O and the load (not shown) and back to the terminal N of the source. Under these circumstances, the nonlinear reactor $1a$ is in its saturated state due to the flow of output current therethrough and scarcely presents an impedance to the load current.

At the same time the capacitor $3a$ is discharging through a circuit including the components $$2a - 5b - 1a2 - 1b1 - 5b - 7.$$

On the other hand, the capacitor $3b$ is charging with a polarity illustrated beside the same through a circuit including the components $$P - 1a1 - 5a - 2a - 7b - 3b - 5d - 162 - N$$

until it is charged to the source voltage and with the polarity illustrated beside the same.

Then upon firing the thyristor $2b$ the voltage across the capacitor $3b$ is operated to initiate the output or load current $i_L$ flowing through the windings $1a2$ and $1b1$ of both the nonlinear reactors $1a$ and $b$ up to that time to be shunted in oscillatory manner through a circuit including the components $$p - 1a1 - 5a - 3a - 7a - 2b - 3b - 7b - 5c - 1a2 - O$$

as shown at current $i_3$ in FIG. 8. Thus the current $i_{2a}$ flowing through the thyristor $2a$ decreases by a magnitude equal to that of the shunted oscillation current $i_3$. The shunt current $i_3$ increases until it is eventually higher than the load current $i_L$. At that time the thyristor $2a$ is deenergized and the commutation diode $6a$ is fired. A current $i_{6a}$ flowing through the fired diode $6a$ is equal to a difference between the oscillatory discharge current $i_3$ from the capacitor $3a$ and the load current $i_L$. In this way the capacitor $3b$ discharges from the source voltage with the polarity illustrated to zero voltage whereas the capacitor $3a$ charges from zero voltage to the source voltage with the polarity illustrated in FIG. 8.

The oscillatory discharge current $i_3$ reaches its maximum magnitude when the voltages across the capacitors $3a$ and $b$ are equal to each other. The current $i_3$ continues to decrease while the commutation reactors $7a$ and $b$ function to effect oscillatory charge and discharge of the capacitors until the oscillatory charge or discharge current $i_3$ equals the load current $i_L$. At that time the commutation diode $6a$ is brought into its nonconducting state and also the capacitor $3b$ has been substantially completed to discharge while the capacitor $3a$ has been substantially completed to charge. In other words, the energy accumulated on the capacitor $3b$ is only transferred to the capacitor $3a$ by means of the action of the oscillation effected by the capacitors $3a$ and $b$ and the commutation reactors $7a$ and $b$ with a minimum loss in energy occurring during that transfer. The commutation time for which the energy is transferred from one to the other capacitors corresponds to one half the period of natural oscillation of the capacitors $3a$ and $b$ and commutation reactors $7a$ and $b$ and has been selected to be in the order of twice the turn-off time of the thyristor. Therefore the transfer of the energy from one to the other capacitors is completed within a very short time.

After the lapse of a period of time for which one of the thyristors is reversely biassed, the capacitor $3a$ is additionally charged through a circuit including the components $$P - 1a1 - 5a - 3a - 7a - 2b - 3b - 7b - 5c - 1a2 - O$$

thereby to supply a slight amount by which each of the capacitor is to be additionally charged or discharged. Then the capacitor $3b$ has discharged to a zero voltaged and the capacitor $3a$ has charged to the source voltage whereupon the main diode $4b$ is fired. This forms a closed loop traced from the terminal P of the source $E_d$ through the component $$1a1 - 5a - 3a - 7a - 2b - 3b - 7b - 5b - 1a2 - 4b$$

and back to the terminal N of the source. This causes the nonlinear reactor $1a$ to be reset to its unsaturated flux region.

Thereafter, the series diodes $5a$ and $c$ serve to prevent the closed loop just described from continuously effecting a damped oscillation due to the residual inductances of the reactor windings $1a1$ and $1a2$ cooperating with the commutation reactors $7a$ and $b$ and the capacitors $3a$ and $b$. Therefore the capacitor $3a$ is additionally charged in oscillatory manner to maintain the voltage thereacross at a maximum peak magnitude of the oscillatory voltage. This causes increase in commutation capability and therefore the system of the FIG. 8 is particularly suitable for the low voltage, high current applications. More specifically, the series diode $5a$ serves to prevent the capacitor $3a$ from discharging while the series diode $5c$ serves to prevent the capacitor $3b$ charged with the polarity opposite to that illustrated in FIG. 8 from discharging. This is true in the case of the series diodes $5b$ and $d$. It is to be noted that any one or more of the series diodes $5a$, $b$, $c$ and $d$ may be omitted, if desired.

Then the load current $i_L$ is reversed in polarity and the nonlinear reactor $1b$ is saturated. Under these circumstance the load current flows through a circuit including the load (not shown), and the components $$O - 1b1 - 5b - 2b - 5d - 1b2 - N$$

Then the process as above described is repeated.

Figure 9:
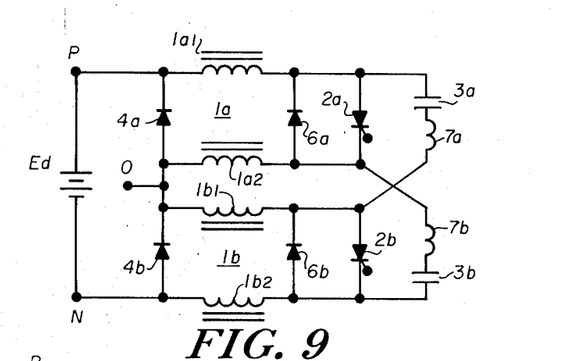
FIG. 9 is a schematic circuit diagram of a modification of the system illustrated in FIG. 8.

FIG. 9 shows a modification of the system of FIG. 8 wherein the windings $1a1$, $1a2$, $1b1$ and $1b2$ of both nonlinear reactors $1a$ and $b$ are disposed so as not to be inductively coupled to one another while the series diodes $5a$, $b$, $c$ and $d$ are omitted. In other respects the arrangement is identical to that shown in FIG. 8. Therefore it will be understood the arrangement is quite identical in operation to that shown in FIG. 8, and the description need not be further made.

Figure 10:
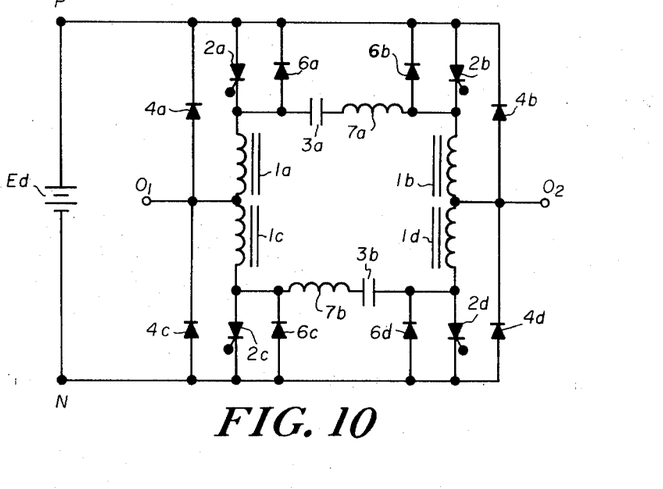
FIGS. 10 and 11 are schematic circuit diagrams of different modifications of the system illustrated in FIG. 5.

FIG. 10 illustrates an arrangement substantially identical to that shown in FIG. 4 excepting that a series combination of commutation reactor and capacitor substitutes the commutation capacitor shown in FIG. 4 and that the thyristors have respective commutation semiconductor diode connected in reverse parallel relationship thereto. For example, a series combination of commutation reactor and capacitor $7a$ and $3a$ substitutes the capacitor 3a shown in FIG. 4 and the commutation diode 6a is connected across the thyristor 2a. Also the thyristors 3a, b, c and d are identical in operation to those shown in FIG. 4. Therefore the arrangement need not be further described.

Figure 11:
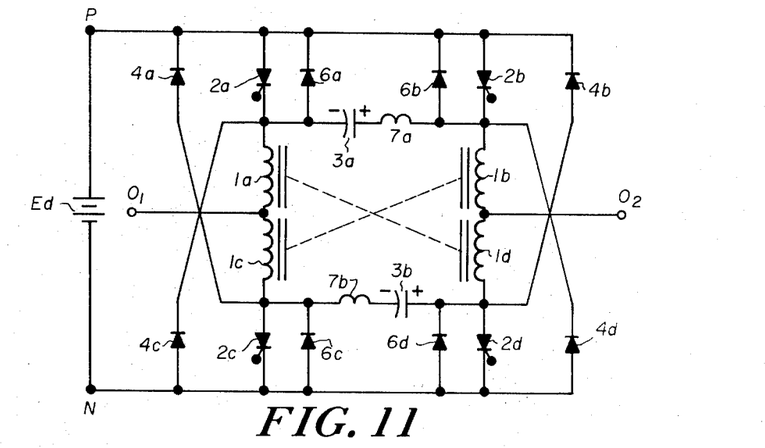

A modification of the system shown in FIG. 10 is shown in FIG. 11. FIG. 11 is different from FIG. 10 in that the nonlinear reactors 1a and d are inductively disposed on a common magnetic core (not shown) while the nonlinear reactors 1b and c are inductively disposed on another common magnetic core (not shown). Further, a pair of serially connected nonlinear reactors 1a and c or 1b and d are connected at both ends to a pair of main diodes 4a and c or 4b and d. Then the diodes 4a and c are connected at the cathode electrodes to the positive terminal P of the source $E_d$ while the diodes 4c and d are connected at the anode electrodes to the negative terminal N of the source.

This connection of the main diodes are particularly effective for preventing the capacitors 3a and b from overcharging in the case the nonlinear reactors are high in residual inductance, that is, inferior in saturation characteristic.

More specifically, considering the process effected after the commutation mode of operation in which the thyristors 2a and d have been brought into their nonconducting state, the main diodes 4a and d are fired when the energy accumulated in the saturated in inductance of each reactor 1a or d tends to additionally charge the associated capacitor 3a or b with the polarity illustrated in FIG. 11. This causes the cathode and anode electrodes respectively of the thyristors 2a and d to be clamped at the respective potentials at the source terminals P and N with the result that the increased voltages across the capacitors 3a and b remain substantially equal in magnitude to the voltage across the source regardless of any voltage induced through the release of the energy accumulated in the saturated inductance of each nonlinear reactor therefrom. Those released energies are delivered to the load (not shown) through the output terminal O.

Figure 12:
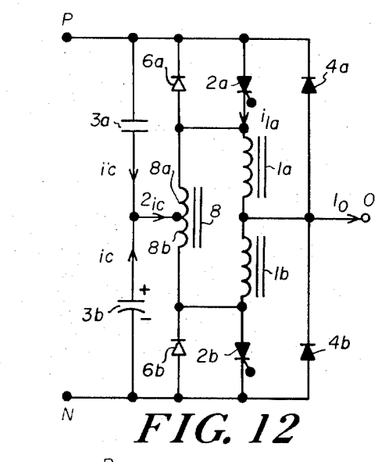
FIG. 12 is a schematic circuit diagram of another modification of the invention.

FIG. 12 illustrates another modification of the invention using a commutation trans former. As shown, a pair of serially connected commutation capacitors 3a and b are connected across and dc input terminals P and N and the junction of both capacitors is connected to an intermediate tap on a commutation transformer shown as being an autotransformer 8. The transformer 8 include a pair of serially connected windings 8a and b and both end terminals connected to the junction of the nonlinear reactor 1a and the thyristor 2a serially connected to each other and across the main semiconductor diode 4a and to the junction of the nonlinear reactor 1b and the thyristor 2b serially connected to each other and across the main semiconductor diode 4b. The diodes 4a and b and therefore a pair of reactor and thyristor combinations 1a, 2a and 1b, 2b are connected across the terminals P and N and the junction of the diodes 4a and b is connected to the load (not shown) through the output terminal O.

It is now assumed that the thyristor 2a is in its conducting state to cause a load current $i_L$ to flow from the positive source terminal P through the now conducting thyristor 2a, the nonlinear reactor 1a and the output terminal O to the load (not shown). The load may be connected between the output terminal O and any one of the terminals P and N and the neutral point of the dc source (not shown ) as the case may be. This is true in the case of various examples including no output transformer or being of the bridge type. Under the assumed condition, the voltage across the capacitor 3a is of a zero magnitude while the voltage across the capacitor 3b has the magnitude of voltage across the terminals P and N. Further the nonlinear reactor 1a has been saturated due to the flow of load current $i_L$ therethrough and the nonlinear reactor 1b is put in its unsaturated flux region as in the previous examples.

Then upon firing the thyristor 2b, a voltage accumulated on the commutation capacitor 3b is applied to the transformer winding 8b of the commutation transformer 8 thereby to induce across the winding 8a a voltage equal in magnitude and polarity to the applied voltage. As a result, the doubled voltage is applied to the thyristor 2a to render it nonconductive. At that time both a closed loop including the components $$3b - 8b - 2b$$

and a closed loop including the components $$P - 3a - 8b - 2b - N$$

form a primary winding with respect to the commutation transformer 8 while the components $$8a - 1a - O$$

as well as the components $$8a - 1a - 1b$$

forms a secondary circuit with respect to the same transformer.

As the capacitors 3b and a discharge and charge respectively, the thyristor 2a decreases in cathode potential leading to the application of a forward voltage to the same. The capacitors 3a and b continue to charge and discharge respectively until the voltage across the capacitor 3b reaches zero magnitude. At that time the output terminal is at a voltage equal to the potential at the source terminal N which initiates firing of the diode 4b.

On the other hand, the nonlinear reactor 1a has its saturated residual inductance on which a some energy has been eccumulated corresponding to the abovementioned flow of load current therethrough. Therefore that reactor has induced thereacross a voltage causing the cathode electrode of the thyristor 2a to be negative with respect to the anode electrode thereof (as shown at the arrow beside the reactor 1a in FIG. 12). The induced voltage causes the magnetic flux in the reactor 1a to be reset from its saturated region to its unsaturated region with the result that the voltaged applied to the thyristor 2a is higher than the source voltage by a magnitude corresponding to the voltage required for resetting the magnetic flux.

When that resetting voltage tends to decrease the potential at the cathode electrode of the thyristor 2a below the potential at the source terminal N (which maintains both the thyristor 2b and the diode 4b conducting), the commutation capacitor 3b is charged to one half the resetting voltage but with the polarity reversed from that illustrated whereas the capacitor 3a is charged to a voltage higher than the source voltage by one half the resetting voltage. In other words, the resetting of the magnetic flux in the nonlinear reactor 1a to its unsaturated region is accomplished in a parallel oscillation circuit formed equivalently of the nonlinear reactor 1a and the commutation capacitors 3a and b through the commutation transformer 8.

Then when the load current is reversed in polarity. The nonlinear reactor 1b is now saturated and the next half cycle of the load current flows through the output terminal O, the reactor 1b and the thyristor 2b after which the process as above described is repeated.

Figure 13:
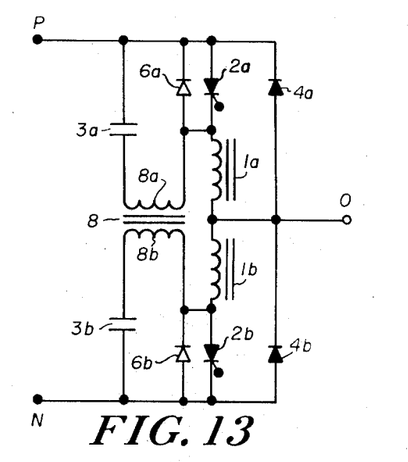
FIGS. 13 through 15 are schematic circuit diagrams of different modifications of the system illustrated in FIG. 12.

FIGS. 13 and 14 show different modifications of the system illustrated in FIG. 12. In FIG. 13, the autotransformer 8 is replaced by a transformer 8 including a primary and a secondary winding 8a and b respectively and the capacitors 3a and b are connected to both windings. At one end, in other respects the arrangement is identical to that shown in FIG. 12.

Figure 14:
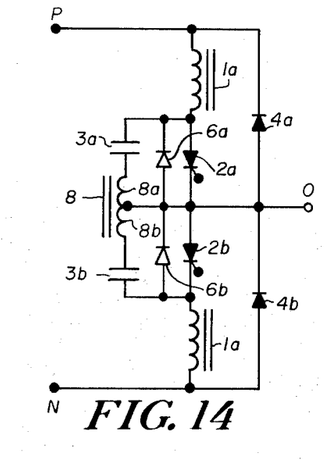

In FIG. 14, the thyristor 2a or b inter changes the associated nonlinear reactor 1a or b in position and the capacitors 3a and b are connected to the transformer 8 at both ends rather than at the intermediate tap. In other respects the arrangement is identical to that shown in FIG. 12.

Figure 15:
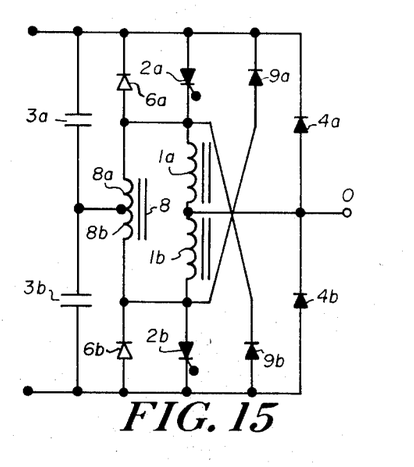

FIG. 15 illustrates still another modification of the system shown in FIG. 12. Only a difference between both the systems is in that in FIG. 15 a pair of clamping semiconductor diodes 9a and b of similar polarity are connected to a pair of serially connected nonlinear reactors 1b and a for the purpose of preventing the voltage across each thyristor 2a or b from exceeding the voltage across the terminals P and N. That is, the anode and cathode electrodes respectively of the clamping diode 9a and b are connected to the ends of the serially connected reactors 1b and a respectively between the source terminals P and N.

In the arrangement of FIG. 12 the nonlinear rector 1a or b cooperates with the capacitors 3a and b to effect an oscillation on the latter portion of the commutation time. Therefore the voltage across the associated thyristor can overshoot the voltage across the terminals P and N, and the energy accumulated on the reactor 1a is transferred to the capacitor. In the arrangement of FIG. 15, however, when the voltage across the thyristor 2a or the capacitor. 3b is in excess of the source voltage the diode 9a is fired. If an energy previously accumulated on the saturated inductance of the reactor 1a is still left in the latter at that time, the energy is delivered to the load (not shown) through the output terminal O.

After the nonlinear reactor 1a has terminated to release the accumulated energy therefrom the diode 4a becomes nonconducting and instead the diode 4b is initiated to be conducting. Under these circumstances the load current flows through both a current path including the diode 9a, the reactor 1a and the output terminal O and another current path including the diode 4b and the output terminal O. The former current path has a relatively high resistance so that the current portion flowing through that path is gradually transferred to the latter current path. Then the load current is decreased or reversed in polarity until it passes through the zero current point. Then the load current begins to flow through the thyristor 2a and the associated components.

Thus it will be appreciated that the clamping diode 9a serves to prevent the potential at the cathode electrode of the thyristor 2a from dropping below the potential at the source terminal N while the clamping diode 9b serves to prevent the potential at the anode electrode of the thyristor 2b from rising beyond the potential at the source terminal P.

Figures 16, 17, 18, 19, 20, 21:
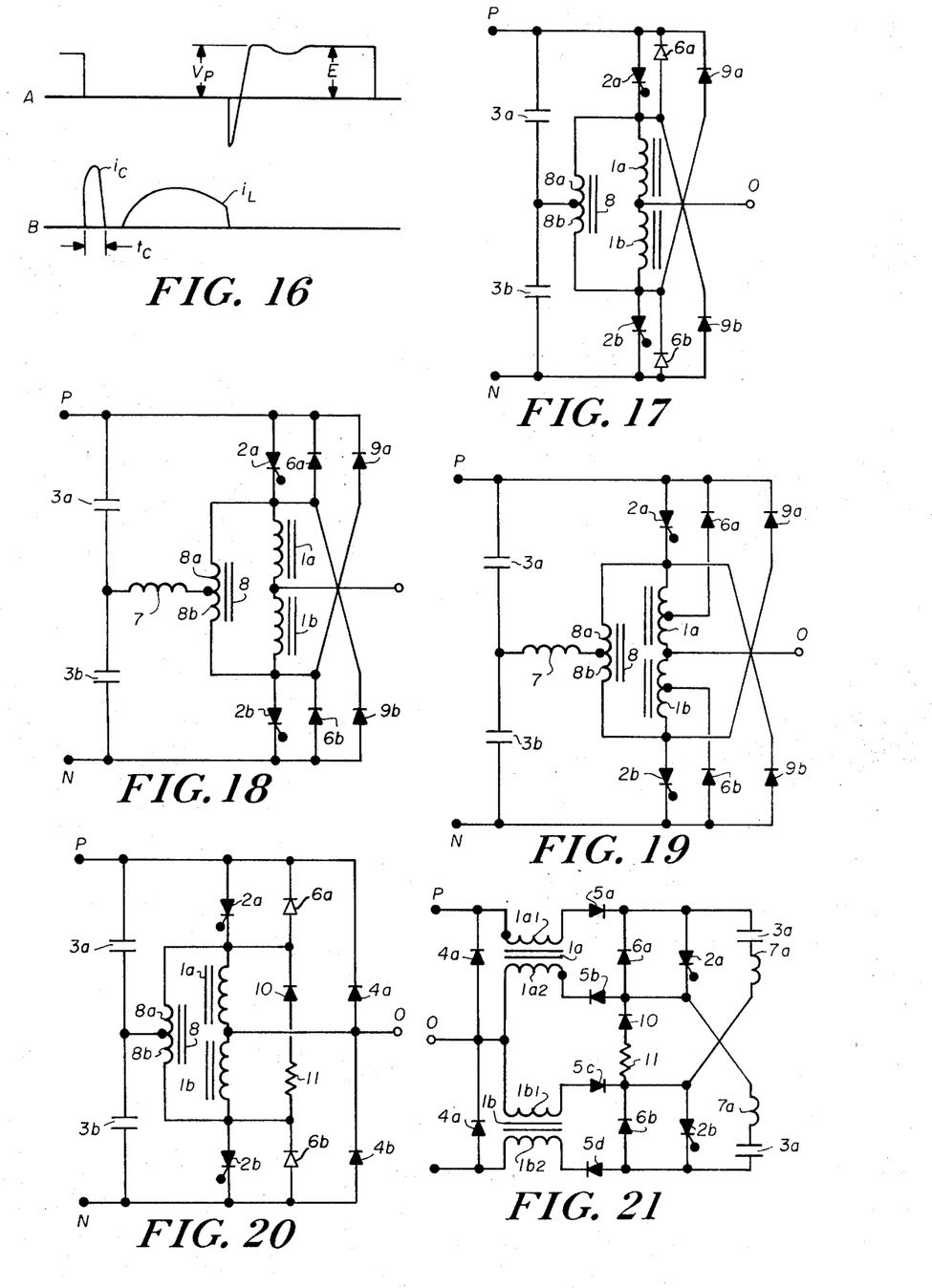
FIG. 16 is a graphic representation of commutation waveforms developed on the system illustrated in FIG. 15.
FIGS. 17 through 19 are schematic circuit diagrams of various modifications of the system illustrated in FIG. 15.
FIG. 20 is a schematic circuit diagram of still another modification of system illustrated in FIG. 12.
FIGS. 21 and 22 are schematic circuit diagrams of different modifications of the system illustrated in FIG. 20.

The waveforms of voltage and current developed in the arrangement of FIG. 15 are shown in FIG. 16 wherein the reference characters have the same meaning as in FIG. 1 or 3. Voltage waveform A indicates that the voltage applied across the thyristor is prevent from overshooting.

FIG. 17 is a view similar to FIG. 15 except for the diodes 4a and b being omitted. The arrangement shown in FIG. 17 has be found to be particularly effective for use with loads lagging in power factor. More specifically, the load current serves to rapidly discharge the capacitor 3b while the nonlinear reactor 1b associated with the now conducting thyristor is prevented from being saturated. This prevents the current flowing through the nonlinear reactor 1a from increasing above the load current.

Therefore a quantity of energy accumulated on the nonlinear reactor is not only very small but also it is delivered to the load while it decreases along with the load current. This is because the other nonlinear reactor 1b is not saturated before the load current is reversed in flow direction. Therefore the energy accumulated on the individual reactor is not lost.

This is true in the case the system of FIG. 12 includes the commutation transformer.

FIG. 18 shows an arrangement similar to that shown in FIG. 17 excepting that one commutation diode 6a or b is connected in reverse parallel circuit relationship to each of the thyristors 2a or b with the commutation capacitors 3a and b connected to the intermediate point on the commutation transformer 8 through a common commutation reactor 7 of air core type.

When the thyristor 2a, for example, is maintained reversely biased the commutation diode 6a is put in its conducting state. The capacitors 3a and b cooperates with the commutation reactor 7 to effect oscillatory charging and discharging respectively whereby the commutation transformer winding 8a has a pulse current in the form of a sinusoid at half-wave flowing toward the cathode electrode of the thyristor 2a therethrough with a pulse recurrence frequency determined by the magnitudes of the commutation capacitors and reactor. During a period of time when the pulse current which might flow through the reactor 1a is higher than that portion of the load current in the just preceding half cycle, the commutation diode 6a is in its conducting state while the thyristor 2a is reversely biased resulting in the improvements in commutation characteristics.

It is noted that the diodes 9a and b serves, in addition to effecting the clamping function as previous described, to perform the operation of the main diodes 4a and b, that is, the operation of feeding back the reactive power of the load. It is also noted that, with the diodes 9a and b omitted the commutation diodes 1a and b can also perform the operation of the main diodes 4a and b respectively.

An arrangement shown in FIG. 19 is different from that illustrated in FIG. 18 only in that the communication diodes 6a and b each are connected across the associated thyristor 2a or b through that winding portions having a small number of turns of the respective nonlinear reactor 1a or b. This measure permits the thyristor to be reversely biased with a higher voltage equal to the sum of the forward voltage drop across the diode and a voltage developed across the winding portion of the associated reactor as above described. As a result, the arrangement is advantageous in that the movement of the carriers in the semiconductive material for the thyristor is accelerated upon rendering the thyristor nonconducting thereby to additionally reduce the turn-off time thereof.

In order to prevent the voltage applied across the thyristor from excessively increasing due to the resetting voltage developed across the nonlinear reactor and also to accelerate resetting of the magnetic flux in the latter, any of arrangements shown in FIGS. 20 through 23 may be effectively used.

The arrangement of FIG. 20 is substantially similar to that shown in FIG. 12 except for a series combination of a semiconductor diode 10 and a damping resistor 11 being connected across a pair of nonlinear reactors 1a and b serially connected to each other.

As previously descirbed in conjunction with FIG. 12, the resetting voltage developed across the nonlinear reactor 1a upon its resetting tends to cause the voltage applied to the thyristor 2a to be higher than the source voltage and also to decrease the potential at the cathode of that thyristor below the potential at the source terminal N. Thereby the commutation capacitor 3b is charged with the polarity reverse from that illustrated leading to the development of a reverse voltage across the commutation transformer 8. At that time the diode 10 is fired to connect the resistor 11 across the serially coneected reactors 1a and b resulting in the suppression of the resetting voltage. This means that the nonlinear reactors are reset to its unsalurated flux region in non-oscillatory manner rather than in oscillatory manner as in FIG. 12. Therefore the arrangement rapidly reaches its steady state operation as compared with that shown in FIG. 12.

As previously described at least one of the serially connected nonlinear reactors 1a and b having the series combination of diode and resistor 10 and 11 respectively connected thereacross, for example, the reactor 1b is put in its unsaturated flux region to exhibit a high impedance. That is it is maintained excited with a low current. Therefore during the resetting of both reactors a current flowing through the diode 10 and the resistor 11 is approximately equal in magnitude to the low exciting current as above described. This permits the magnitude of resistance 11 to be selected at will within limits of the desired rate at which the magnetic fluxiis reset and of the desired extent to which the voltage applied to each across Rach thyristor can increase.

The arrangement of FIG. 21 is substantially similar to that shown in FIG. 8 in which the series combination of diode and damping resitor 10 and 11 is connected in parallel circuit relationship with the serially connected nonlinear reactors 1a and b. Therefore the diode and resistor combination is equivalently coupled across one half the total windings of both the reactors, assuming that the primary winding is equal in number of turns to the secondary winding for each reactor. Therefore as compared with the arrangement of FIG. 20, the damping resistor 11 is preferably selected to have a resistance decreased by a factor of four so that the current flowing therethrough is doubled while the resulting voltage drop thereacross is halved. In other respects the arrangement is identical to that shown in FIG. 20. If desired, the seried diodes 5a, b, c and d may be omitted.

Figure 22:
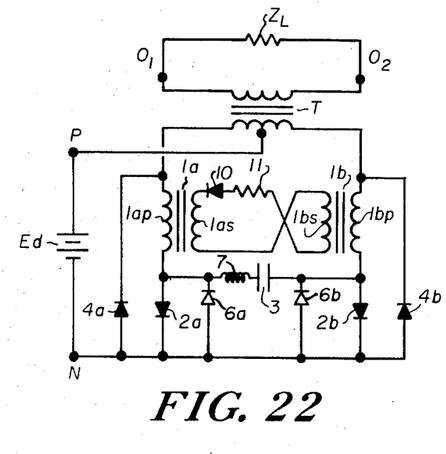

FIG. 22 shows another modification of the system illustrated in FIG. 2 or 20. The nonlinear reactors 1a and b are provided with secondary windings $1a_s$ and $1b_s$ serially interconnected through the series combination of diode and damping resistor 10 and 11. In other respects the arrangement is substantially similar to that shown in FIG. 2, and therefore its operation will be readily understood from the description as previously made for FIGS. 2 and 20.

Figure 23:
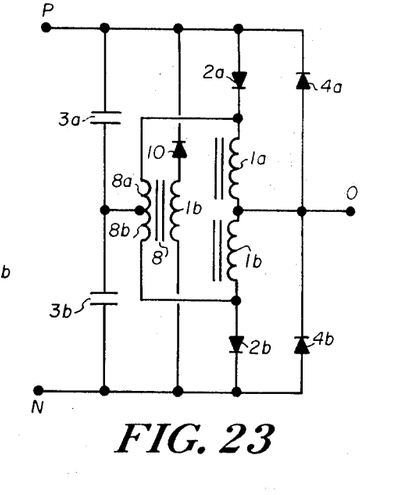
FIG. 23 is a schematic circuit diagram of another modification of the system shown in FIG. 12.

FIG. 23 shows another modification of the system illustrated in FIG. 12. The commutation autotransformer 8 connected across a pair of serially connected nonlinear reactors 1a and b is provided with a secondary winding $8s$ connected across the terminals P and N through a semiconductor diode 10. In other respects the arrangement is identical to that shown in FIG. 12.

In the arrangement of FIG. 23, whatever low power results from the resetting of the magnetic flux is fed back to minimize a loss of energy while the resetting of the magnetic flux is accomplished at a predetermined constant rate and hence more rapidly.

If desired, the nonlinear reactors 1a and b may be provided with respective secondary windings connected to the terminals P and N through the diode 10 with the secondary commutation winding $8s$ omitted. Alternatively the secondary windings just described may be serially connected together and across the terminals P and N through the diode 10.

The means for suppressing a rate of change in magnetic flux as above described is effective for rapidly resetting the magnetic flux without any increase in thyristor voltage or power loss. Thus the operation is possible to be performed at higher frequencies. For example, as compared with the systems including no means for suppressing a rate of change in magnetic flux, the operating frequency has increased by a factor of two or three for FIGS. 20 through 22 and by a factor of about four to five for FIGS. 23. Although a power loss has been scarcely different between the presence and absence of such means at the order of commercial frequency a disparity therebetween has been a several times as large at a frequency of from 200 to 500 Hz at which the flux resetting somes into question.

Figure 24:
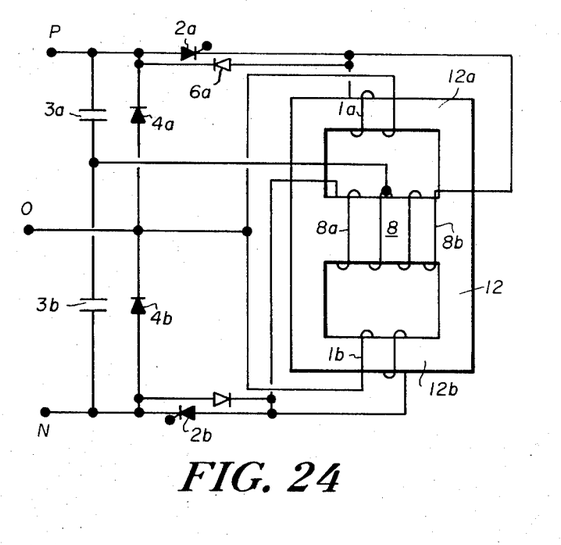
FIG. 24 is a schematic circuit diagram of another modification of the system illustrated in FIG. 15 and illustrating a structure of a commutation transformer involved.

In order for the systems as above described to be simple in construction in expensive to be manufactured while improving the capability, the nonlinear reactors and commutation transformer can be formed into a unitary structure such as shown in FIG. 24 wherein the system of FIG. 12 is also illustrated. A shell type magnetic core generally designated by the reference numeral 12 has a pair of outer legs 12a and b on which a pair of nonlinear reactor windings 1a and b are inductively disposed and a central leg 12c on which a pair of commutation windings 8a and b are inductively disposed in series circuit relationship.

If desired, the central core leg 12c may have inductively disposed thereon the secondary windings $1a_s$ and $1b_s$ for suppressing a resetting rate for magnetic flux as shown in FIG. 22 or the secondary windings $1a_s$ and $1b_s$ as shown in FIG. 23. Further the central core 12c may have inductively disposed thereon a dc biasing winding as will be described hereinafter.

Figure 25:
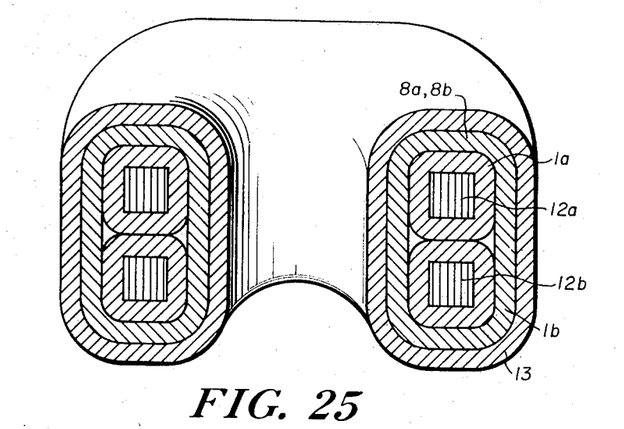
FIG. 25 is a perspective crosssectional view of a modification of the transformer illustrated in FIG. 24.

FIG. 25 shows another transformer including a pair of superposed magnetic cores 12a and b in the form of toroids, the nonlinear windings 1a and b inductively disposed on the toroidal cores 12a and b respectively, the commutation windings 8a and b inductively disposed around the nonlinear windings 1a and b, and a dc biasing winding 13 inductively disposed around the windings 8a and b.

The toroidal core is generally formed of any suitable magnetic material high in magnetic properties. Its use leads to a decrease in commutation loss, and controls operative at high frequencies. Due to the core being continuous, the noise is much decreased. Also such core can have the perfectly rectangular hysteresis loop thereby to decrease the residual inductance of the associated nonlinear reactor and therefore oscillations duce to that residual inductance. With the rectangular hysteresis loop the biasing winding serves to reset the magnetic flux in the core.

In summary, at least two thyristor serially connected to the nonlinear reactors respectively are alternately turned on and off so that a voltage charged on the commutation capacitor is reversely applied across the previously conducting thyristor through the now conducting thyristor while during that reversely biasing time that nonlinear reactor serially connected to the now conducting thyristor is in its unsaturated flux region thereby to maintain a high impedance between the output terminal and the dc source terminal or between the source terminals.

Under these circumstances, it is required to reset the magnetic flux in either of the nonlinear reactor during a period of time for which the thyristor serially connected to that reactor is in its nonconducting state. An extent to which the magnetic flux is reset depends upon the function of the nonlinear reactor for holding the succeeding unsaturation and corresponds to a change in magnetic flux capable of being utilized when the unsaturation is held.

Figure 26:
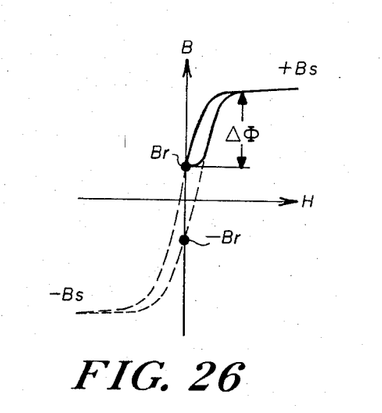
FIG. 26 is a graph illustrating a magnetic hysteresis loop for a magnetic core used in a nonlinear reactor constructed in accordance with the principles of the invention.

If separate magnetic cores are used to form different nonlinear reactors operated in the manner just described the operation of each magnetic core is expressed by solid hysteresis loop shown in FIG. 26 wherein the axis of ordinates represents the magnetic induction B or flux density and the axis of abscissas represents the magnetic field intensity H. From FIG. 26 it is seen that the resetting is accomplished to the remanence Br inherent to the magnetic material involved and that a change $\Delta\phi$ in magnetic flux avaiable equals a difference between the saturated flux density Bs and the remanence Br. Therefore the effective resetting range has been rather narrow.

Further a rate at which the magnetic flux increases in the nonlinear reactor is extremely high corresponding to the turn-off time of the thyristor and equivalent to a high frequency. Therefore it is desirable to render the high frequency characteristics good while decreasing the magnetomotive force because of a small number of turns of the associated winding. This desirability generally has resulted in increases in remanence Br and flux density difference $\Delta\phi$ which is, in turn, accompanied by the large-sized nonlinear reactor.

Figure 27:
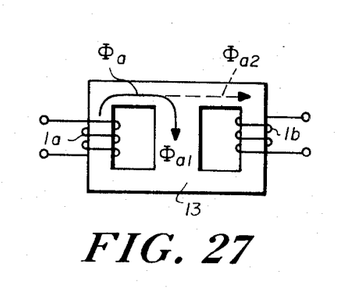
FIGS. 27 and 28 are diagrams useful in explaining the manner in which a magnetic core of a nonlinear reactor involved is reset to an unsaturated flux region according to the principles of the invention.
Figure 28:
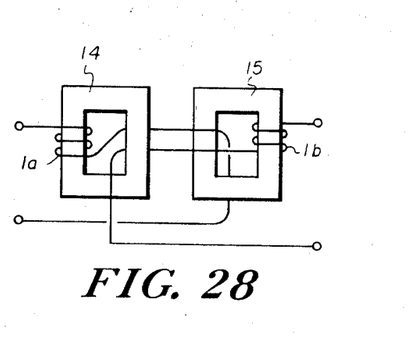

In order to eliminate those disadvantages, the nonlinear reactors can be effectively formed into a unitary structure as diagramatically shown in FIG. 27 or 28. FIG. 27 shows a single shell type magnetic core 13' including a pair of outer legs on which a pair of nonlinear reactor windings 1a and b are inductively disposed. In the arrangement illustrated magnetic paths established in the core with currents flowing through the nonlinear reactors 1a and b during different periods of time are partly common to each other.

Figure 29:
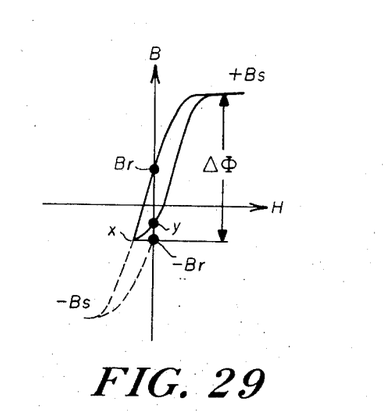
FIG. 29 is a view similar to FIG. 26.

It is now assumed that a current is flowing through the nonlinear reactor 1a to generate a magnetic flux of $\Phi_a$ in the core as shown at solid line in FIG. 27 until the core reaches magnetic saturation. At that time a shunt flux $\Phi_{a2}$ as shown at dot line in FIG. 27 is caused to flow toward the nonlinear reactor 1b to reset it. In this event the core material has a hysteresis loop such as shown at solid line in FIG. 29. When the current flowing through the reactor 1b passes through the zero current point the resetting is effected from the positive saturation Bs to the remanence Br and further from the remanence Br to a point x in the negatively unsaturated region in the process of flowing the load current through the nonlinear reactor 1a (see FIG. 29). Even if the said load current decreases before the succeeding commutation the magnetic flux density remain at a point y resulting in the effective change in flux increasing as shown at $\Delta\phi$ in FIG. 29.

In FIG. 28, a pair of core type magnetic cores 14 and 15 juxtaposed to each other substitutes the single shell type core 13' as shown in FIG. 27. The greater parts of the nonlinear reactor 1a, b windings are wound around the outer legs of the juxtaposed cores while the winding on each core is partly wound around the other leg of the other core. In the arrangement illustrated, the load current of large magnitude flows through one of the reactors and also through that portion thereof small in number of turns and disposed on the other core thereby to reset that core.

The arrangement is advantageous in that as the resetting can be effected in the vicinity of the negative saturation-Bs the negative remanence-Br can be utilized in the succeeding commutation. Therefore if a magnetic material having a rectangular hysteresis loop is used, that-Br is approximately equal to the negative sturation-Bs to permit the utilization of the substantially entire change in magnetic flux.

In addition the dc biasing winding as above described may be equally used to expand the range within which the magnetic flux can change.

While the invention has been illustrated and described in conjunction with various preferred embodiments thereof it is to be understood that numerous changes and modifications may be resorted to without departing from the sperit and scope of the invention. For example, it is to be noted that the invention is not restricted to the use of the nonlinear reactors and that any suitable linear reactors may be used with satisfactory results excepting that a power loss due to the energy accumated on the reactor is somewhat increased.

Further the invention has been illustrated and described in terms of direct current-to-alternating current inverters in which the source terminals P and N serve to supply a dc voltage and an ac output is developed at the output terminal O or the output terminals $O_1$ and $O_2$. However it is to be understood that the invention is not restricted to such inverters and that it is equally applicable to the so-called DC-to-DC converters or choppers wherein a load is connected between the output terminal O and the source terminal P or N or between the output terminals $O_1$ and $O_2$ and wherein at least two thyristors change in conduction ratio therebetween to control the dc power supplied to the load. In order to control the conduction ratio, the thyristors may be alternately turned on and off at a high frequency and the conduction ratio is modulated with a frequency sufficiently less than the on-off frequency. This measure is known as the high frequency pulse width modulation DC-AC inverters.

What is claimed is:

1. A power control system comprising, in combination, a pair of direct current (dc) source terminals, a pair of alternating current (ac) output terminals, first and second series circuits each connected at one end to one of said dc terminals and coupled at their other ends, respectively, to said ac terminals, wherein each said series circuit comprises a semiconductor controlled rectifier and a non-linear reactor, means connecting the other of said dc terminals in a current carrying path with said first and second series circuits, and a pair of semiconductor diodes connected, respectively, in parallel with said controlled rectifiers and in a reverse polarity relationship therewith, a third series circuit comprising a commutation reactor and a commutation capacitor connected at one end to the junction of one of said nonlinear reactors and controlled rectifiers, so that said controlled rectifiers are switched sequentially to provide an ac output voltage at said ac terminals.

2. A power control system as claimed in claim 1, wherein the other end of said series combination of said commutation capacitor and reactor is connected to the junction of the other of said semiconductor controlled rectifiers and its associated nonlinear reactor.

3. A power control system as claimed in claim 1, further comprising third and fourth semiconductor diodes connected respectively in parallel with said first and second series circuits and in opposed polarity with the controlled rectifiers in said first and second series circuits.

4. A power control system as claimed in claim 1, wherein said nonlinear reactors are provided with respective secondary windings and a fourth series combination including a fifth semiconductor diode and a damping resistor connected between said secondary windings.

5. A power control system comprising, in combination, a pair of direct current (dc) source terminals, a pair of alternating current (ac) output terminals, first and second series circuits each connected at one end, respectively, to said dc terminals and coupled at their other ends to one of said ac terminals, wherein each said series circuit comprises a semiconductor controlled rectifier and a nonlinear reactor, and a pair of semiconductor diodes connected respectively, in parallel with said controlled rectifiers and in a reverse polarity relationship therewith, a commutation circuit including a pair of commutation capacitors, a commutation transformer having first and second magnetically coupled windings, and circuit means for connecting said first and second capacitors and windings to said controlled rectifiers for supplying an ac current path to said ac terminals due to alternate switching of said controlled rectifiers.

6. A power control system as claimed in claim 5, wherein said two commutation capacitors are serially connected across said pair of direct current source terminals, and one of said commutation transformer windings is a tapped winding connected across the junctions of said serially connected semiconductor controlled rectifiers and nonlinear reactors, the junction of said commutation capacitors being connected to the tap on said one transformer winding.

7. A power control system as claimed in claim 5, wherein said two commutation capacitors are serially connected across said pair of direct current source terminals, and one of said commutation transformer windings is a tapped winding connected across the junctions of said serially connected semiconductor controlled rectifiers and nonlinear reactors, the junction of said commutation capacitors being connected to the tap on said one transformer winding, and wherein a semiconductor diode and a control resistor are connected in series across the junctions of said serially connected semiconductor controlled rectifiers and nonlinear reactors.

8. A power control system as claimed in claim 5, wherein said commutation transformer further includes a third winding and a third semiconductor diode connected in series across said pair of direct current source terminals.

9. A power control system as claimed in claim 5, further comprising magnetic coupling means for interlinking said first and second transformer windings and said first and second reactors.

10. A power control system as claimed in claim 5, further comprising a three-leg magnetic core having the windings of said nonlinear reactors inductively disposed respectively on the outer legs thereof, and said first and second windings of said commutation transformer inductively disposed on the central leg thereof.

11. A power control system as claimed in claim 5, further comprising at least two toroidal magnetic cores which are axially superposed and have the windings of said nonlinear reactors inductively disposed respectively thereon, said first and second windings of said commutation transformer being inductively disposed on both said magnetic cores.

12. A power control system as claimed in claim 1, further comprising a three-leg magnetic core having the windings of said first and second reactors inductively disposed, respectively, on the outer legs of said magnetic core.

13. A power control system as claimed in claim 1, further comprising a pair of magnetic cores, wherein each of said nonlinear reactors includes a first winding inductively disposed on a different one of said magnetic cores and a second winding disposed on the opposed magnetic core and having flowing therethrough a load current passing through the other nonlinear reactor for resetting the magnetic fluxes in said nonlinear reactors.

* * * * *